Nov. 3, 1953  B. H. ALLEN  2,657,623
ELEVATING MEANS FOR ROW MARKERS
Filed Dec. 20, 1948  2 Sheets-Sheet 2

Benjamin H. Allen
INVENTOR.

Patented Nov. 3, 1953

2,657,623

UNITED STATES PATENT OFFICE 2,657,623

ELEVATING MEANS FOR ROW MARKERS

Benjamin H. Allen, Lamesa, Tex.

Application December 20, 1948, Serial No. 66,157

1 Claim. (Cl. 97—230)

The present invention relates to new and useful improvements in row markers for farm implements and more particularly to means for attaching the marker to a farm tractor in a manner whereby the marker will be automatically raised when the plows are raised out of working position by the power lift of the tractor.

An important object of the invention is to provide a vertically swingable marker at each side of the tractor together with mechanism operated by a raising movement of the tool bar for the plows to automatically raise both markers and also providing manually operated releasing means for the markers to selectively lower either of the markers when the plows are lowered into working position.

A still further object of the invention is to provide an attachment for farm tractors of this character which may be easily and quickly attached in position to the tractor without necessitating any changes or alterations in the construction thereof and which at the same time is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
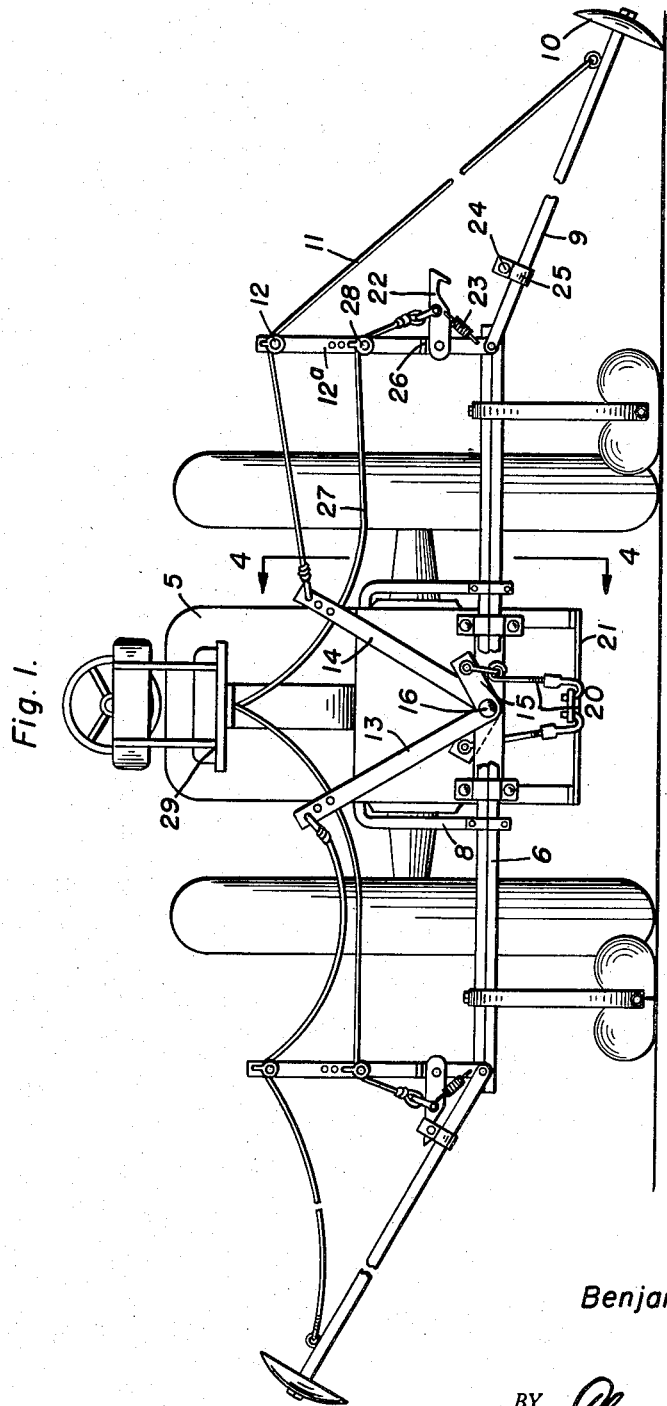
Figure 1 is a rear elevational view.
Figure 2:
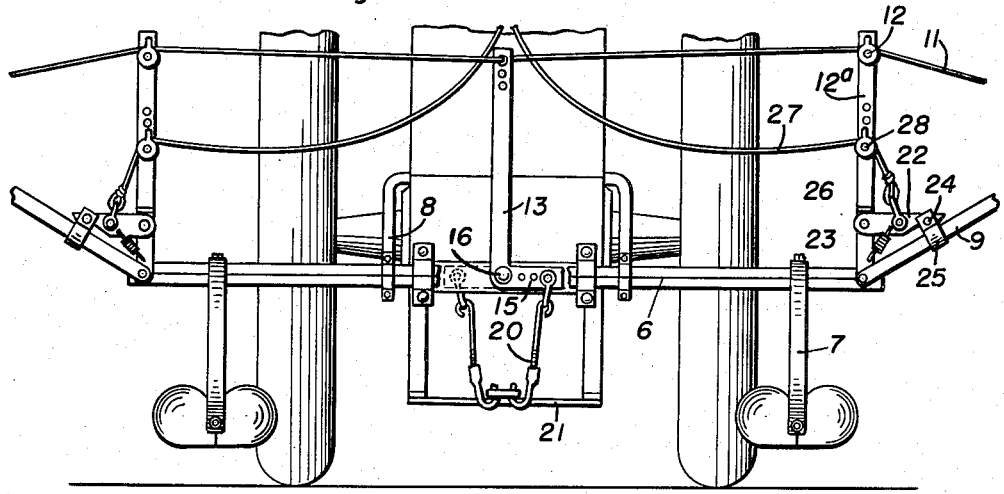
Figure 2 is a similar view showing the markers in raised position.

Referring now to the drawings in detail, wherein for the purpose of illustration I have disclosed a preferred embodiment of the invention, the numeral 5 designates a farm tractor of a conventional type and provided at its rear end with a transversely extending tool supporting bar 6 to which the plows 7 are attached, the tool supporting bar being raised and lowered to move the plows into and out of working position by means of the power lift mechanism 8 of the tractor, said bar being supported by said mechanism for lifting and draft thereby.

Figure 3:
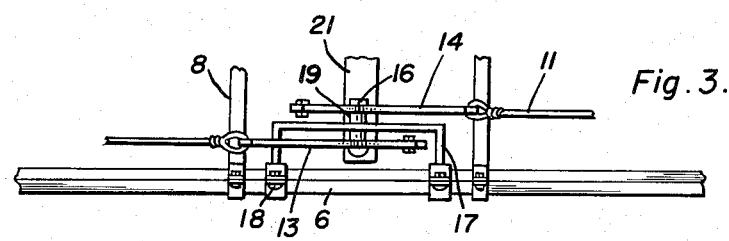
Figure 3 is a fragmentary top plan view of the tool bar showing the lift levers for the markers attached thereto.
Figure 4:
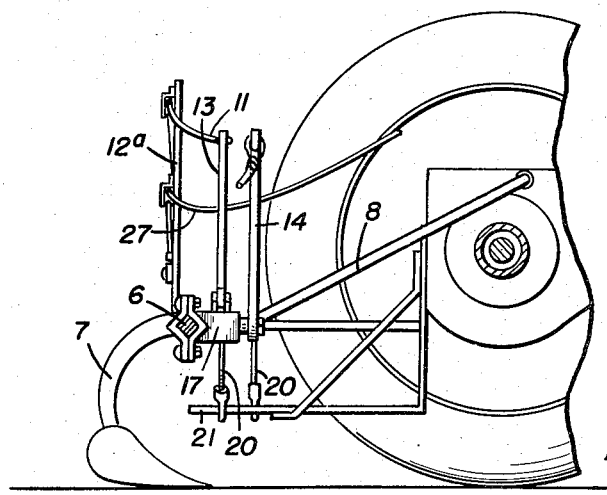
Figure 4 is a transverse sectional view taken substantially on the line 4—4 of Figure 1.

A marker arm 9 is pivotally attached at each end of the tool supporting bar for vertical swinging movement, the arm extending outwardly at the end of the tool supporting bar and is provided at its outer end with the usual marker 10. Each marker arm 9 is raised by means of a rope or cable 11 attached at one end adjacent the outer end of the arm 9 and extending upwardly and inwardly over a pulley 12 at the upper end of a standard 12a suitably secured in an upright position at the outer end of the tool supporting bar. The rope or cable 11 extends inwardly from the pulley 12 to the upper end of a bellcrank lever 13 constituting a lift lever for the marker. Lever 13 is substantially L-shaped and has a long arm 14 and a short arm 15. Separate lift levers 13 are provided for each marker and are pivotally mounted at the junction of their arms 14 and 15 for vertical swinging movement on a single pivot pin 16 supported at the central portion of a U-shaped bracket 17 secured to the tool supporting bar 6 by clamps 18. Spacing washers 19 are positioned between the levers 13 and the bracket 17 with the levers positioned at opposite sides of the central portion of the bracket as shown more clearly in Figure 3 of the drawings.

An adjustable terminally hooked link or connector 20 is pivoted at its upper end to each short arm 15 of the levers 13 and is engaged at its lower end to a rearwardly extending bracket 21 suitably secured to the rear portion of the tractor, the bracket 21 being positioned below the tool supporting bar 6.

A pivoted catch 22 is carried at the lower portion of each standard 12a and is held in a lowered position by a spring 23 for engaging a pin 24 secured to the marker arm by a clamp 25. A stop 26 carried by the standard 13 above the catch limits the lowering movement thereof.

A releasing pull cord 27 is attached to the catch 22 and extends over a pulley 28 carried by the standard to a position adjacent the seat 29 of the tractor for raising the catch by the operator thereof.

In the operation of the device, either or both of the marker arms 9 may be placed in a lowered position when the tool supporting bar 6 is lowered to hold the plows in a working position. In this position the long arms 14 of the lift levers 13 are inclined outwardly in upstanding position toward their associated marker arms, as shown in Figure 1.

When the tool supporting bar is raised, the connectors 20, which engage the short arms 15 of the levers 13, will pull the levers into an upright position to thus pull ropes 11 and raise the marker arms 9 until catch 22 engages pin 24 to hold the marker arms in a raised position.

The marker arms 9 remain in a raised position when held by catch 22, in either a raised or lowered position of the tool supporting bar, until each catch is released by its pull cord 27 to lower its associated marker arm by grvaity.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

The combination with a tractor having a rear transverse supporting bar vertically movable relative to the tractor, of a marker arm pivoted to one end of said bar for vertical swinging movement between a lowered laterally-extending position and a raised transport position, a bellcrank lever pivotally mounted on the central portion of said bar for vertical swinging movement about a pivot axis extending transversely of said bar, said lever having an upstanding long arm and a short arm joined together at said pivot axis with said long arm disposed on one side of said pivot axis and said short arm on the other side, a bracket fixed to and extending rearwardly from said tractor below said bar, a link interconnecting said short arm and said bracket to impart upward swinging movement to said long arm of the bellcrank lever from a normal position upon upward movement of said bar, and operating connections between said long arm of the bellcrank and said marker arm for swinging said marker arm upwardly upon upward swinging of said long arm, said operating connections comprising a flexible pull member interconnecting said long arm and said marker arm.

BENJAMIN H. ALLEN.

References Cited in the file of this patent

UNITED STATES PATENTS

| Number | Name | Date |
|---|---|---|
| 785,173 | King | Mar. 21, 1905 |
| 1,085,374 | Bollenbach | Jan. 27, 1914 |
| 1,888,502 | Holstein | Nov. 22, 1932 |
| 1,901,539 | Tapp | Mar. 14, 1933 |
| 1,911,218 | White | May 30, 1933 |
| 2,063,852 | Ray | Dec. 8, 1936 |
| 2,178,124 | Robinson | Oct. 31, 1939 |
| 2,247,534 | Von Schlegell | July 1, 1941 |
| 2,337,801 | Cook | Dec. 28, 1943 |
| 2,341,146 | Kriegbaum et al. | Feb. 8, 1944 |
| 2,352,466 | Arps | June 27, 1944 |
| 2,363,749 | Rude | Nov. 28, 1944 |
| 2,371,037 | Englund | Mar. 6, 1945 |
| 2,376,464 | White | May 22, 1945 |
| 2,502,067 | Weaks | Mar. 28, 1950 |